United States Patent
Xu et al.

(10) Patent No.: US 9,141,855 B2
(45) Date of Patent: Sep. 22, 2015

(54) ACCELERATED OBJECT DETECTION FILTER USING A VIDEO MOTION ESTIMATION MODULE

(71) Applicant: Intel Corporation, Santa Clara, CA (US)

(72) Inventors: Lin Xu, Beijing (CN); Yangzhou Du, Beijing (CN); Jianguo Li, Beijing (CN); Qiang Li, Beijing (CN); Ya-Ti Peng, Sunnyvale, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 13/977,506

(22) PCT Filed: Dec. 20, 2012

(86) PCT No.: PCT/CN2012/087017
§ 371 (c)(1),
(2) Date: Jun. 28, 2013

(87) PCT Pub. No.: WO2014/094275
PCT Pub. Date: Jun. 26, 2014

(65) Prior Publication Data
US 2014/0348434 A1    Nov. 27, 2014

(51) Int. Cl.
*G06K 9/62* (2006.01)
*G06K 9/74* (2006.01)
*G06K 9/00* (2006.01)

(52) U.S. Cl.
CPC .......... *G06K 9/0055* (2013.01); *G06K 9/00986* (2013.01); *G06K 9/6201* (2013.01); *G06K 9/6257* (2013.01); *G06K 2009/6213* (2013.01)

(58) Field of Classification Search
None
See application file for complete search history.

(56) References Cited

U.S. PATENT DOCUMENTS

| | | | | |
|---|---|---|---|---|
| 4,792,976 A | * | 12/1988 | Watari | 704/243 |
| 6,167,390 A | * | 12/2000 | Brady et al. | 706/20 |
| 2007/0091203 A1 | * | 4/2007 | Peker et al. | 348/415.1 |
| 2007/0297645 A1 | * | 12/2007 | Pace | 382/103 |
| 2009/0006295 A1 | * | 1/2009 | Angell et al. | 706/21 |
| 2012/0207340 A1 | * | 8/2012 | Bulan et al. | 382/100 |

FOREIGN PATENT DOCUMENTS

| | | |
|---|---|---|
| CN | 101877058 A | 11/2010 |
| CN | 102375993 A | 3/2012 |
| CN | 102449661 A | 5/2012 |

OTHER PUBLICATIONS

International Search Report and Written Opinion Received for PCT Patent Application No. PCT/CN2012/087017 mailed on Sep. 19, 2013, 12 Pages.
Taiwan Office Action mailed from Taiwan Patent Office on Jun. 1, 2015, for Taiwan Patent Application No. 102144197.

* cited by examiner

*Primary Examiner* — Utpal Shah
*Assistant Examiner* — Mai Tran
(74) *Attorney, Agent, or Firm* — Green, Howard & Mughal LLP

(57) ABSTRACT

Systems, apparatus and methods are described related to accelerated object detection filter using a video estimation module.

12 Claims, 8 Drawing Sheets

ACCELERATED OBJECT DETECTION FILTER USING A VIDEO MOTION ESTIMATION MODULE

BACKGROUND

Object detection has a wide range of applications. For example, face detection may be used in human-computer interaction, photo-album management, biometric authentication, video surveillance, automatic-focus imaging, and a variety of other vision systems. Human detection may be used in video surveillance, advanced driver assistance systems, and the like. Other object detection examples include traffic monitoring, automated vehicle parking, character recognition, manufacturing quality control, object counting and quality monitoring.

In some existing object detection systems, a Viola-Jones cascade detection framework is used. In the Viola-Jones cascade detection framework, an input image is scanned with a sliding window to probe whether or not a target exists in the window using a cascade classifier. Such methods ma employ feature-based classifiers, which are complicated to implement. Additionally, such methods are computationally intensive. Various software and hardware implementations have been proposed, however the proposed implementations have limitations, particularly as image and video resolutions increase.

Since object detection may be used in such a side variety of applications, it may be desirable to make object detection execute efficiently.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
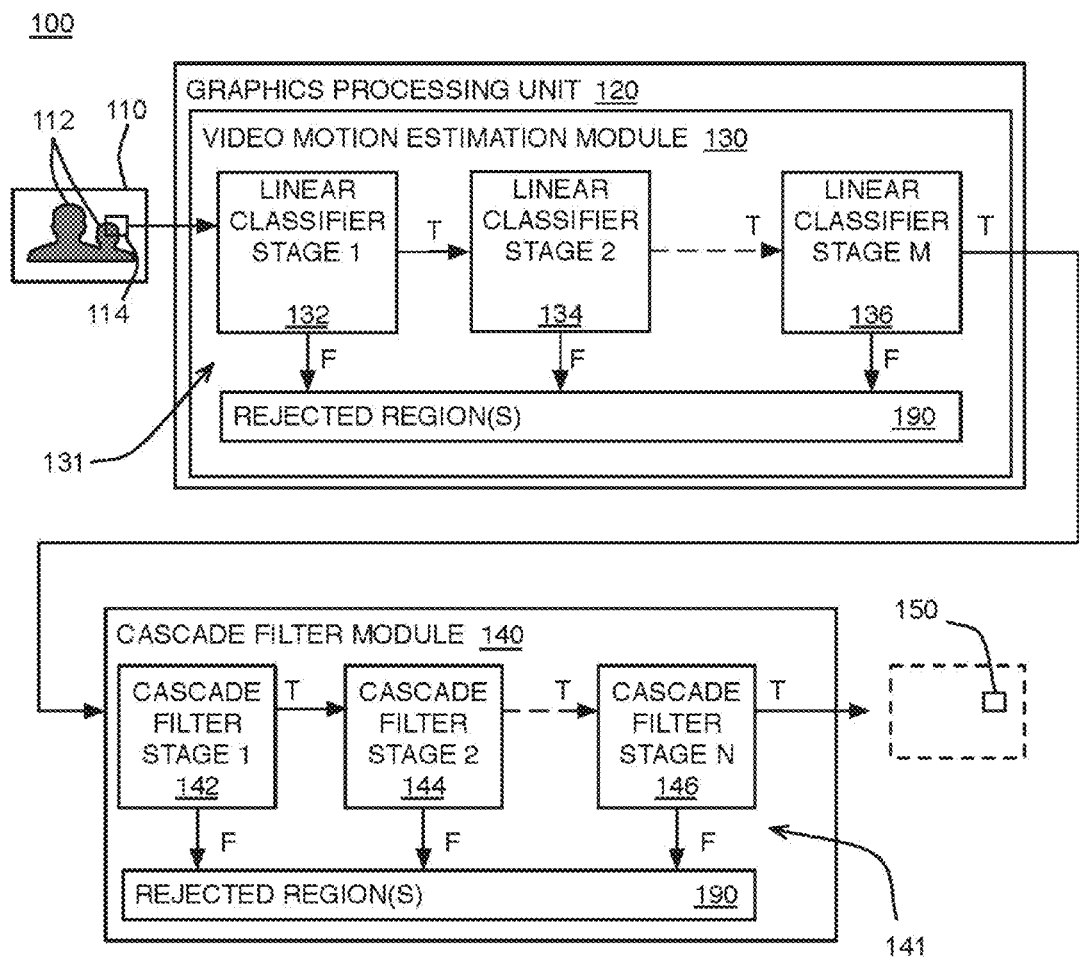
FIG. 1 is an illustrative diagram of an example object detection and/or recognition system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described related to an accelerated object detection filter using a video estimation module.

As described above, object detection has a wide range of applications. However, current implementations of object detection are computationally intensive and have limitations such as not realizing real-time object detection and/or recognition, consuming a large portion or all of available computational resources, and being power intensive.

As described in greater detail below, a video motion estimation module may be repurposed to implement a linear classifier to accelerate object detection and provide greater efficiency such that real-time object detection and/or recognition may be attained and computational resources and power may be saved. For example, a graphics processing unit may include a video estimation module that may typically provide motion vector estimation and similar computations for video encoding. As used herein, a video estimation module may include any module configured to provide motion vector estimation and similar computations in video coding applications. For example, a video estimation module may provide a computation that sums the dot product of a weighting vector and a vector of the absolute value difference of a vector of a current block and a vector of a reference block. In motion vector and video coding contexts, such a computation may provide a measurement of a (weighted) difference between the current block and the reference block, for example.

As described in greater detail below, such a calculation may be repurposed for object detection pre-filtering. For example, an individual region of an input image may be selected or determined. The above calculation may be repurposed to determine a computation that sums the dot product of a weighting vector and a vector of the absolute value difference of a vector representing the region and a reference vector. In this context, the reference vector may be chosen to enhance the classification of the region as likely including an object or portion of an object of interest (i.e., passing the linear classifier pre-filtering) or unlikely to include an object or portion of an object of interest (i.e., failing the linear classifier pre-filtering and being rejected). For example, in facial recognition applications, the reference vector may represent a random representative face or a face representing a statistical mean of faces, or the reference vector may be a zero-valued reference vector. Similarly, in this context, the weighting vector may be pre-trained to enhance object recognition pre-filtering. For example, in facial recognition applications, the weighting vector may be pre-trained by a number of images including faces and a number of images not including faces.

The above described computation may be compared to a threshold or otherwise evaluated to determine if the region passes the pre-filter. Such a pre-filter stage may be described as a linear classifier implemented via a video motion estimation module. As discussed, a failing region may be rejected. A passing region may be transferred for object recognition processing or a passing region may be tested at any number of additional linear classifier pre-filter stages. Such additional stages may become increasingly difficult to pass, for example. Such stages implemented via a video motion estimation module may share the commonality that they are linear classifiers. In other examples, a passing region (e.g., a region passing a single stage or multiple linear classifier stages implemented via a video motion estimation module) may be transferred to a cascade filter for additional testing. The cascade filter may include any suitable type of cascade filter such as, for example, a Viola-Jones cascade filter or framework or a Speeded Up Robust Features (SURF) cascade filler or framework, as discussed further below. In some examples, the cascade filter may implement feature-based classifier stage(s).

As will be appreciated, other regions of the image may be similarly evaluated and pre-filtered such that only a portion of the image (i.e., the portion of the image not pre-filtered) may be processed by an object recognition module. Such pre-filtering may save valuable computational resources.

In general, object detection as discussed herein may include detecting whether and/or where, in an input image, an object (i.e., an object of a category of interest) may be in the input image. For example, in facial detection, detection may include detecting a face. Further, object recognition as discussed herein may include recognizing a particular object (i.e., an individual of the category of interest). For example, in facial recognition, recognition may include identifying which person is associated with a detected face. The described hardware-based convolution pre-filter may provide a fast, reliable, and low computing and power cost process for object detection and/or recognition implementations.

FIG. 1 is an illustrative diagram of an example system 100 for object detection and/or recognition, arranged in accordance with at least some implementations of the present disclosure. As shown, system 100 may include a video motion estimation module 130 implemented via graphics processing unit 120 and a cascade filter module 140. In various implementations, system 100 may be configured to perform object detection and/or recognition, including performing object detection pre-filtering. As is discussed further below, system 100 may be employed via various hardware implementations with the commonality that video motion estimation module 130 may be implemented via graphics processing unit 120. For example, graphics processing unit 120 may include hardware or a portion of hardware dedicated to, or at least partially dedicated to, perform computations related to video motion estimation and, in particular, those computations discussed herein. In some examples, video motion estimation module 130 may be a shared function or resource that may provide motion estimation services. In various implementations, cascade filter module 140 may be implemented via graphics processing unit 120 or other components of system 100, such as central processing unit(s), which are discussed further below, but are not shown in FIG. 1 for the sake of clarity.

As is discussed further below, system 100 may also include an object recognition module or additional modules or components, which are not shown in FIG. 1 for the sake of clarity. For example, system 100 may include a radio frequency-type (RF) transceiver, a display, an antenna, a speaker, a microphone, an accelerometer, memory, a router, network interface logic, etc.

As discussed, in some examples, system 100 may perform object detection operations or object detection pre-filter operations. For example, system 100 may receive an input image 110, which may include one or more objects of interest 112. In general, input image 110 may be any suitable image or video data such as, for example, an image file or a video frame, or the like. Object of interest 112 may generally include any object for which object detection and/or recognition may be desired such as, for example, a face, an eye, a landmark, a written character, a human, or an automobile, or the like. In FIG. 1, facial recognition is used as an illustrative example. As will be appreciated, in some examples, input image 110 may not include an object of interest.

As shown, a region 114 of input image 110 may be selected or determined. Region 114 may be determined by any suitable module or component such as video motion estimation module 130, another module of graphics processing unit 120, or central processing unit(s) of system 100, for example. As will be appreciated, input image 110 may be divided into a number of regions and an individual region or regions may be determined and processed as described. In some examples, the entirety of input image 110 may be processed as each of its region may be evaluated in turn. In various implementations, processed regions may overlap or processed regions may not cover the entirety of input image 110.

As shown in FIG. 1, video motion estimation module 130 of graphics processing unit 120 may apply a linear classifier cascade filter 131 to region 114 and cascade filter module 140 may apply a cascade filter 141 to determine whether region 114 is an object candidate region 150. Object candidate region 150 may be related to a passing region (i.e., a region that passed all stages of linear classifier cascade filter 131 and/or cascade filter 141). As shown, linear classifier cascade filter 131 may include an number of stages, illustrated as linear classifier stage 1 132, linear classifier stage 2 134, and linear classifier stage N 136. Similarly, cascade filter 141 may include any number of stages, illustrated as cascade filter stage 1 142, cascade filter stage 2 144, and cascade filter stage N 146.

In general, individual regions of input image 110 may be processed through linear classifier cascade filter 131 as implemented by video motion estimation module 130. At stages 132-136 of linear classifier cascade filter 131, region 114 may be tested to determine whether it passes the stage. In general, the stage may include a true/false test. If region 114 passes the stage (e.g., the test with respect to the region is determined to be true), illustrated as "T" in FIG. 1, region 114 may be transferred to the next stage. In such examples, region 114 may be classified or labeled as an object candidate region. If regions 114 fails the stage (e.g., the test with respect to the pixel is determined to be false), illustrated as "F" in FIG. 1, region 114 may be rejected, discarded, and/or labeled as rejected 190. Linear classifier cascade filter 131 may include any number of stages 132-136 such as, for example, 3 stages. In some implementations, a single stage may be used. As discussed, if a region passes a stage, the region may be classified as an object candidate region. If a region passes a second stage, the region may be classified as a second stage object candidate region and so on. As will be appreciated, for a region that passes all the stages of linear classifier cascade filter 131, the region may simply be classified as an object candidate region, a passing region, a linear classifier passing region, or the like.

Similarly, regions of input image 110 may be processed through cascade filter 141. At stages 142-146 of cascade filter 141, region 114 may be tested to determine whether it passes the stage, for example. As shown, the stage may include a true/false test. If region 114 passes the stage (e.g., the test with respect to the region is determined to be true), illustrated as "T" in FIG. 1, region 114 may be transferred to the next stage. If regions 114 fails the stage (e.g., the test with respect to the pixel is determined to be false), illustrated as "F" in FIG. 1, region 114 may be rejected, discarded, and/or labeled as rejected 148. In some examples, cascade filter 141 may differ from linear classifier cascade filter 141 in that stages 142-146 may include non-linear classifiers. For example, any of stages 142-146 may implement feature based classification(s). If a region passes each stage of cascade filter 141 second stage, the region may be classified as a cascade filter stage object candidate region, a passing region, a cascade filter passing region, or the like.

As discussed, cascade filter 141 may include any suitable type of cascade filter such as, for example, a Viola-Jones cascade filter or framework (see, e.g., Paul Viola, Michael Jones, Rapid Object Detection using a Boosted Cascade of Simple Features, CVPR 2001 and/or PCT/CN2010/000997, by Yangzhou Du, Qiang Li, entitled TECHNIQUES FOR FACE DETECTION AND TRACKING, filed Dec. 10, 2010). Such object detection techniques may allow object detection and/or recognition to include face detection, landmark detection, face alignment, smile/blink/gender/age detection, face recognition, detecting two or more faces, and/or the like. In some examples, cascade filter 141 may include a boosted cascade filter.

In other examples, the cascade filter may include a Speeded Up Robust Features (SURF) cascade filter or framework (see, e.g., Bay et al., "Surf: Speeded up robust features," Computer Vision and Image Understanding (CVIU), 110(3), pages 346-359, 2008 and/or PCT/CN2011/081642, by Jianguo Li, Yimin Zhang, entitled OBJECT DETECTION USING EXTENDED SURF FEATURES, filed Nov. 1, 2011). Such object detection techniques may also allow object detection and/or recognition to include face detection, landmark detection, face alignment, smile/blink/gender/age detection, face recognition, detecting two or more faces, and/or the like.

Returning to discussions related to linear classifier cascade filter 131, in general, the test implemented at the various stages of linear classifier cascade filter 131 may include a determination of whether a region may be deemed likely to include an object of interest or portion of an object of interest.

As discussed above, video estimation module 130 may be configured to provide an estimate of a motion vector for a video. Also as discussed, video estimation module 130 may be configured to provide a computation that sums the dot product of a weighting vector and a vector of the absolute value difference of a vector of a current block and a vector of a reference block. Such a computation may be shown as follows in equation (1):

$$Y = \text{SUM}\{\text{weight}(i) * \text{ABS}[\text{curr\_block}(i) - \text{ref\_block}(i)]\} \quad (1)$$

where Y may be the computation result, SUM may be a summation function over i, i may be a counter variable (e.g., counter variable i may run from 1 to n, with n being the total number of pixels evaluated), ABS may be an absolute value function, weight may be a weighting term, curr_block may be a current block, and ref_block may be a reference block. As will be appreciated, in motion vector and video coding contexts, such a computation may provide a measurement of a difference between the current block and the reference block. If the weighting term used (i.e., given a value of 1), the computation provides a measure of a similarity of the blocks (i.e., a measure of how similar curr_block is to ref_block). The weighting term, in this context, may introduce different importance(s) to different areas or regions of image or frames of a video.

In the context of object detection and/or recognition, video estimation module 130 may be configured to apply linear classifier stages 1-N 132, 134, and/or 136. Such an application of a linear classifier stage may classify the region as an object candidate region (i.e., pass the region) or reject the region. For example, equation (1) may be repurposed as shown in equation (2):

$$y = \vec{W} \cdot | \vec{X} - \vec{M} | \quad (2)$$

where y may be the computation result, $\vec{W}$ may be a weighting vector, $\vec{X}$ may be a vector representing region 114, and $\vec{M}$ may be a reference vector. In the context of object detection, equation (2) may provide a determination of an absolute value difference vector based on an absolute value difference between a vector representing region 114 (i.e., $\vec{X}$) and a reference vector (i.e., $\vec{M}$), a determination of a result value (i.e., y) based on a dot product of the absolute value difference vector and a weighting vector (i.e., $\vec{W}$). The determined result value (i.e., y) may be compared to a threshold value and, based on the comparison, region 114 may be determined to have passed or failed the linear classifier stage.

Using such techniques, for example, video estimation module 130 may apply a linear classifier (e.g., a linear classifier of one of classifier stages 1-N 132, 134, and/or 136) by determining an absolute value difference vector based on an absolute value difference between a vector representing the region and a reference vector, determining a result value based on a dot product of the absolute value difference vector and a weighting vector, and comparing the result value to a threshold value.

In such implementations, equation (2) may be treated as a distribution function, for example, such that reference vector, $\vec{M}$, may describe a center of data and $\vec{W}$ may reflect a variance in each dimension. In general, reference vector, $\vec{M}$, may be chosen in a linear form. In general, reference vector, $\vec{M}$, may also be chosen for its efficacy in providing accurate classification at stages 132-136. For example, reference vector, $\vec{M}$, may be chosen to represent a zero-valued patch (i.e., $\vec{M}$=0), a mean object (i.e., a statistical mean object), or a random representative object. Further, weighting vector, $\vec{W}$, may be chosen and/or calculated based on its efficacy in providing accurate classification at stages 132-136. For example, weighting vector, $\vec{W}$, may be determined or calculated as a reciprocal of standard deviation (STD) for each pixel in a region having an object, using linear discrimination analysis (LDA), or using a support vector machine (SVM), or the like. Results related to the choice of such reference vector, $\vec{M}$, and methodologies related to determining weighting vector, $\vec{W}$, in facial detection applications are discussed further below and, in particular, with respect to FIG. 4.

A result value or computation result, y, may be utilized to determine whether region 114 passes the pertinent stage. For example, the result value may be compared to a threshold value (e.g., a determination may be made as to whether the result value is greater than or less than the threshold value, as appropriate) to determine whether region 114 passes the pertinent stage. The applied threshold may include, for example, a pre-determined threshold, a pre-trained threshold, or the like. The threshold may be chosen based on its efficacy in providing an accurate classification at stages 132-136 and it may be trained over time, for example.

Using such techniques, for example, video estimation module 130 may apply a linear classifier (e.g., a linear classifier of one of classifier stages 1-N 132, 134, and/or 136) by determining an absolute value difference vector based on an absolute value difference between a vector representing the region and a reference vector, determining a result value based on a dot product of the absolute value difference vector and a weighting vector, and comparing the result value to a threshold value.

Further, in some implementations, rejected region(s) 190 may be used in training, such as training a weighted vector, $\vec{W}$, or the applied threshold, or rejected region(s) 190 may be used in choosing reference vector, $\vec{M}$. Such training may be applied via graphics processing unit 120 or central processing unit(s) discussed herein.

As will be appreciated, the processes and components discussed with respect to FIG. 1 may be implemented in a variety of ways. In some implementations, a single linear classifier may be used without a cascade filter. In such examples, a single linear classifier may be used to determine whether a region is deemed likely to include an object of interest or a portion of an object of interest. In some implementations, a single linear classifier may be used with a cascade filter. Similarly, a multi-stage linear classifier cascade may be used with or without a cascade filter. In any event, object candidate region(s) (i.e., regions passing the utilized implementation) may be deemed likely to include an object of interest or a portion of an object of interest. Such regions may optionally be merged (e.g., by graphics processing unit 120 or by one or more processing units) Similarly, either merged or non-merged regions may be processed for object recognition. Object recognition may be performed by an object recognition module of graphics processing unit 120 or one or more processing units, for example. As discussed above, object detection may include determining whether or where in an input image may include object of interest (e.g., the input image includes a written character) and object recognition may include identifying what particular object the object may be (e.g., the written character is a "S").

As will be discussed in greater detail below, system 100 may be used to perform some or all of the various functions discussed below in connection with FIGS. 2 and/or 3, or the functions previously discussed with respect to FIG. 1.

Figure 2:
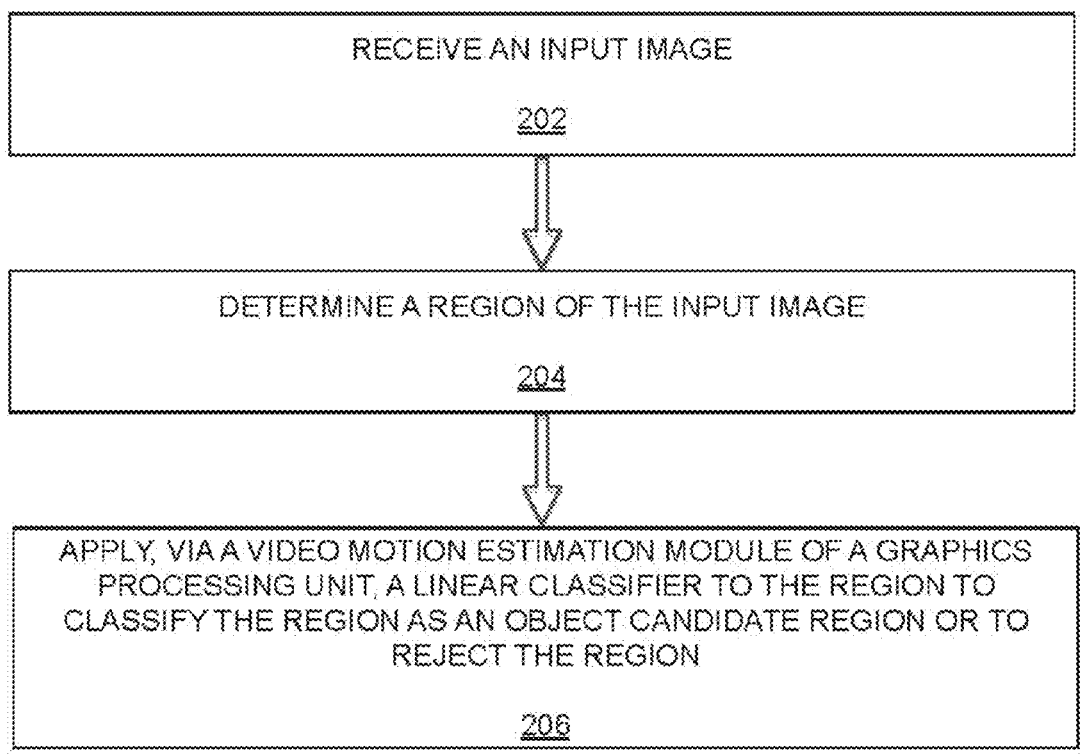
FIG. 2 is a flow chart illustrating an example object detection and/or recognition process.

FIG. 2 is a flow chart illustrating an example object detection and/or recognition process 200, arranged in accordance with at least some implementations of the present disclosure. In the illustrated implementation, process 200 may include one or more operations, functions or actions as illustrated by one or more of blocks 202, 204 and/or 206. By way of non-limiting example, process 200 will be described herein with reference to example system 100 of FIG. 1.

Process 200 may be utilized as a computer-implemented method for object detection and/or recognition. Process 200 may begin at block 202, "RECEIVE AN INPUT IMAGE", where an input image may be received. For example, the input image may include any suitable image data such as, for example, an image file or a video frame, or the like. The input image may be received at graphics processing unit 120 and/or video motion estimation module 130, for example. The input image may be received using any suitable techniques and may be received by system 100 from another device, may be generated internally at system 100 and transferred from another module of system 100 to graphics processing unit 120, or may be generated internally at another module of graphics processing unit 120 and transferred to video motion estimation module 130.

Processing may continue from operation 202 to operation 204, "DETERMINE A REGION OF THE INPUT IMAGE", where an individual region of the input image may be determined. The region may be determined, for example, by video motion estimation module 130 of graphics processing unit 120, another module of graphics processing unit 120, or by central processing unit(s), or the like. The region may an individual region of multiple regions of the input image, for example.

Processing may continue from operation 204 to operation 206, "APPLY, VIA A VIDEO MOTION ESTIMATION MODULE OF A GRAPHICS PROCESSING UNIT, A LINEAR CLASSIFIER TO THE REGION TO CLASSIFY THE REGION AS AN OBJECT CANDIDATE REGION OR TO REJECT THE REGION", where a linear classifier may be applied to the region to determine whether the region is an object candidate region (i.e., passes the liner classifier and is deemed likely to can an object of interest or a portion of an object of interest) or to reject the region. The linear classifier may be implemented via video motion estimation module 130 of graphics processing unit 120, for example. Video motion estimation module 130 of graphics processing unit 120 may also be configured to estimate a motion vector for a video coding and to provide similar video coding computations, for example.

Process 200 may be repeated for other region(s) of the input image. Further, region(s) passing the linear classifier may be cascaded through any additional number of linear classifier stages, for example. Optionally, region(s) passing the linear classifier may be processed by a single or multi-stage cascade filter. The resulting object candidate region(s) (if any) may be optionally merged. Either the object candidate region(s) or merged object candidate region(s) may be further processed by performing object recognition on the regions to identify an object of interest or a portion of an object of interest in the regions. For example, the object recognition may identify any objects which may include, for example, a face, an eye, a landmark, a written character, a human, or an automobile, or the like.

Some additional and/or alternative details related to process 200 may be illustrated in one or more examples of implementations discussed in greater detail below with regard to FIG. 3.

Figure 3:
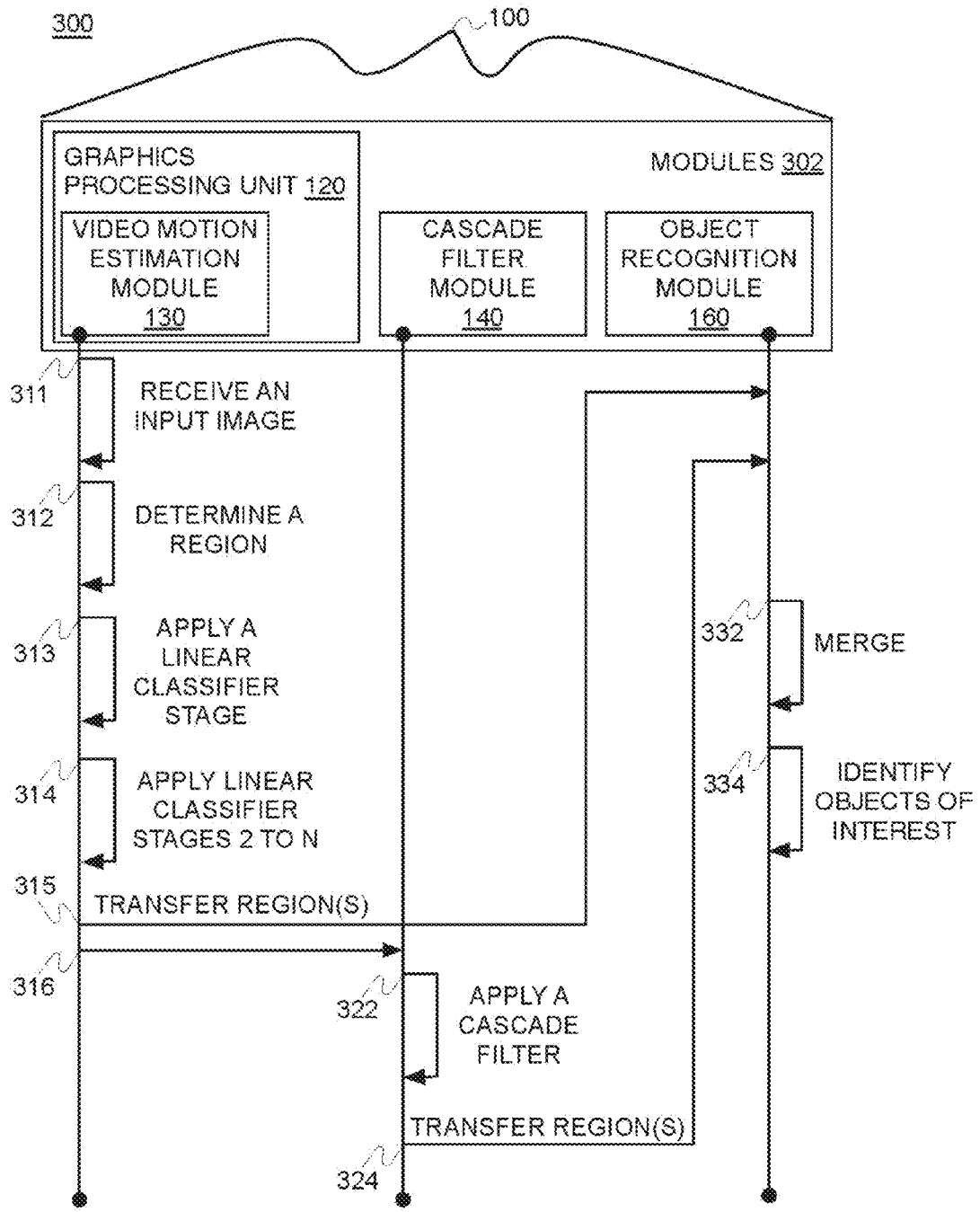
FIG. 3 is an illustrative diagram of an example object detection and/or recognition process in operation.

FIG. 3 is an illustrative diagram of example system 100 and process 300 for object detection and/or recognition in operation, arranged in accordance with at least some implementations of the present disclosure. In the illustrated implementation, process 300 may include one or more operations, functions or actions as illustrated by one or more of actions 311, 312, 313, 314, 315, 316, 322, 324, 332, and/or 334. By way of non-limiting example, process 300 will be described herein with reference to example system 100 of FIG. 1.

In the illustrated implementation, system 100 may include modules 302, the like, and/or combinations thereof. For example, modules 302, may include video motion estimation module 130, cascade filter module 140, object recognition module 160, or the like, and/or combinations thereof. Video motion estimation module 130 may be implemented via graphics processing unit 120 and may be configured to determine a region of an input image and apply a linear classifier to the region to classify the region as an object recognition module or to reject the region. Video motion estimation module 130 may be configured to apply the linear classifier by determining an absolute value difference vector based on an absolute value difference between a vector representing the region and a reference vector, determining a result value based on a dot product of the absolute value difference vector and a weighting vector, and comparing the result value to a threshold value, for example. Video motion estimation module 130 may be configured to apply multiple additional linear classifier(s) to any region passing the initial classification. Cascade filter module 140 may be configured to classify a region passing the linear classifier(s) as a cascade filter stage object candidate region or to reject the region. Object recognition module 160 may be configured to perform object recognition on regions passing cascade filter module 140. Object recognition module 160 may also be configured to optionally merge passing regions prior to performing object recognition.

Process 300 may be utilized as a computer-implemented method for object detection and/or recognition. Process 300 may begin at block 311, "RECEIVE AN INPUT IMAGE", where an input image may be received. For example, an input image may be received at graphics processing unit 120 and/or video motion estimation module 130. The input image may be received by system 100 from another device or may be generated internally at system 100.

Processing may continue from operation 311 to operation 312 "DETERMINE A REGION", where an individual region of the input image may be determined. The region may be an individual region of multiple regions of the input region and may be selected or determined for object detection and/or recognition processing.

Processing may continue from operation 312 to operation 313, "APPLY A LINEAR CLASSIFIER STAGE", where a linear classifier stage may be applied to the region. The linear classifier stage may be applied by video motion estimation module 130 implemented via graphics processing unit 120 and may determine whether the region is an object candidate region (i.e., passes the liner classifier and is deemed likely to can an object of interest or a portion of an object of interest) or a rejected the region. Applying the linear classifier stage may include repurposing the video motion estimation module 130, for example, to provide a computation based on a dot product of and absolute value difference vector (i.e., a vector determined by applying an absolute value difference to a vector representing the region and a reference vector) and a weighting vector. The resulting computation value may be compared to a threshold value to determine whether the region passes the linear classifier stage.

Processing may continue from operation 313 to operation 314, "APPLY LINEAR CLASSIFIER STAGES 2 TO N", where additional classifier stages may be optionally applied to a passing region. Any number of additional stages may be applied including, for example, an additional two stages. Any additional stages may be applied by video estimation module 130. As a region passes addition stages, the region may be classified as such. For example, if a region passes a second linear classifier stage the region may be classified as a second stage object candidate region, if a region passes a third linear classifier stage the region may be classified as a third stage object candidate region, and so on.

Processing may continue from operation 314 to operation 315 or 316, both labeled "TRANSFER REGION(S)", where one or more object candidate regions may be transferred to cascade filter module 140 and/or object recognition module 160. As discussed, in some examples, any determined object candidate regions may be further processed by applying a cascade filter. In other examples, any determined object candidate regions may be passed directly to object recognition module 160.

Processing may continue at operation 322, "APPLY A CASCADE FILTER", where a cascade filter may be applied to any received region to determine whether it may be a cascade filter stage object candidate region (i.e., a region passing the cascade filter). The applied cascade filter may include any number of stages such as, for example, 7 stages. The applied cascade filter may include any suitable cascade filter such as, for example, a boosted cascade filter, a Viola-Jones cascade filter, a Viola-Jones cascade filter implementing feature based classification, or a SURF cascade filter, for example.

Processing may continue from operation 322 to operation 324, "TRANSFER REGIONS)", where any region(s) classified as cascade filter stage object candidate region(s) may be transferred from cascade filter module 140 to object recognition module 160.

Processing may continue at operation 332, "MERGE", where any received region(s) that passed prior processing may optionally be merged to form one or more merged object candidate regions. The merge may be implemented via graphics processing unit 120 or one or more central processing unit(s), for example.

Processing may continue from operation 332 to operation 334, "IDENTIFY OBJECTS OF INTEREST", where object recognition module 160 may perform object recognition on received object candidate regions and/or merged object candidate regions. Object recognition module 160 may identify any objects which may include, for example, a face, an eye, a landmark, a written character, a human, or an automobile, or the like. Object recognition module 160 may be implemented via graphics processing unit 120 or one or more central processing unit(s), for example.

While implementation of example processes 200 and 300, as illustrated in FIGS. 2 and 3, and processes discussed with respect to FIG. 1 may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3, and processes discussed with respect to FIG. 1, may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 2 and 3 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As discussed, in operation, process 200 and/or process 300 may operate as a linear classifier and/or a linear classifier cascade (i.e., multiple linear classifier stages may be concatenated to form a linear classifier cascade) for object recognition pre-filtering. Also as discussed, a video motion estimation module may be utilized to apply the one or multiple linear classifier stages via repurposing the calculation discussed with respect to equation (1) and equation (2). Further, in the computation, a reference vector, $\vec{M}$, may be chosen, and a weighting vector, $\vec{W}$, may be determined. As will be appreciated, the reference vector, $\vec{M}$, and weighting vector, $\vec{W}$, may influence the efficacy of an applied linear classifier stage.

Figure 4:
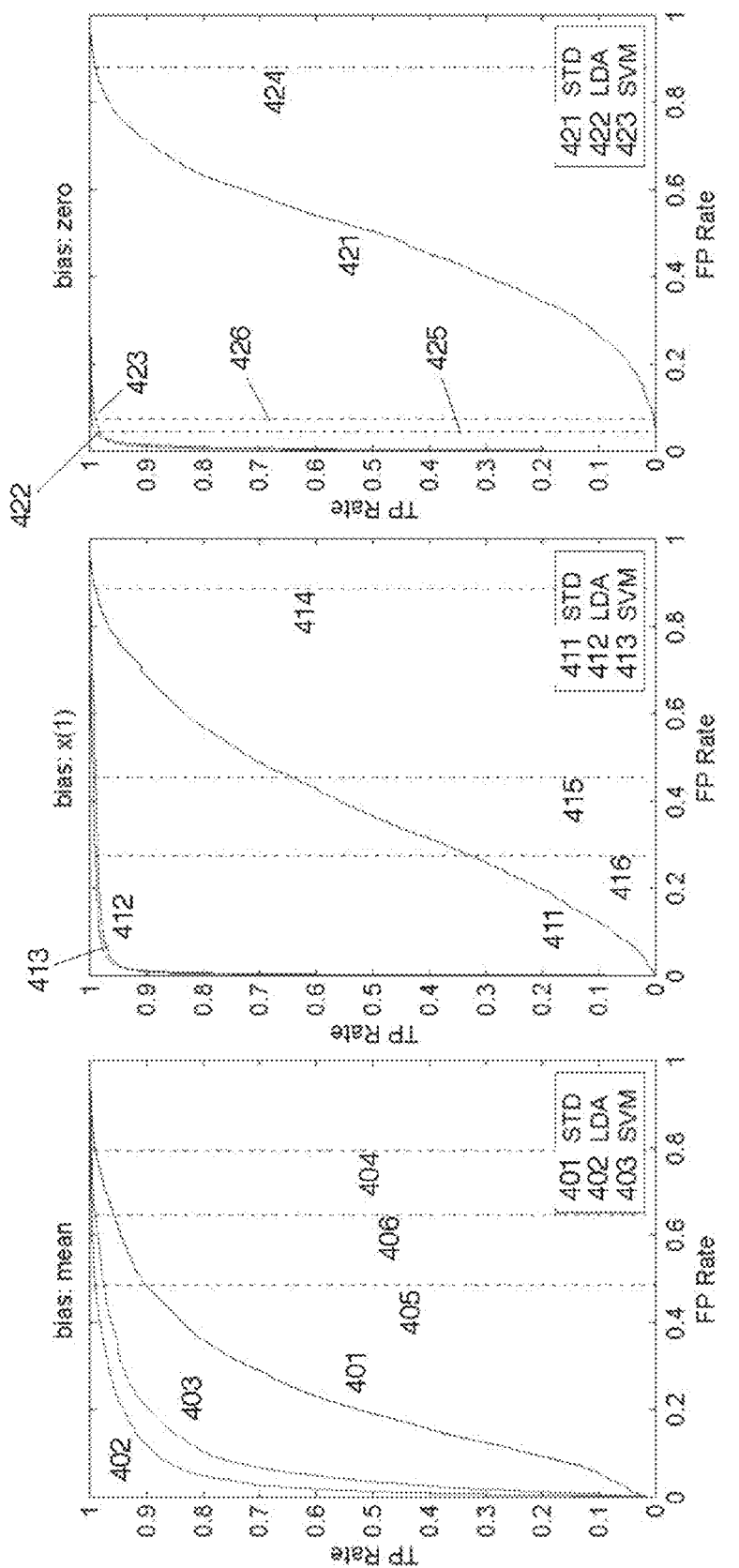
FIG. 4 is a group of charts illustrating results of example linear classifiers.
Figure 5:
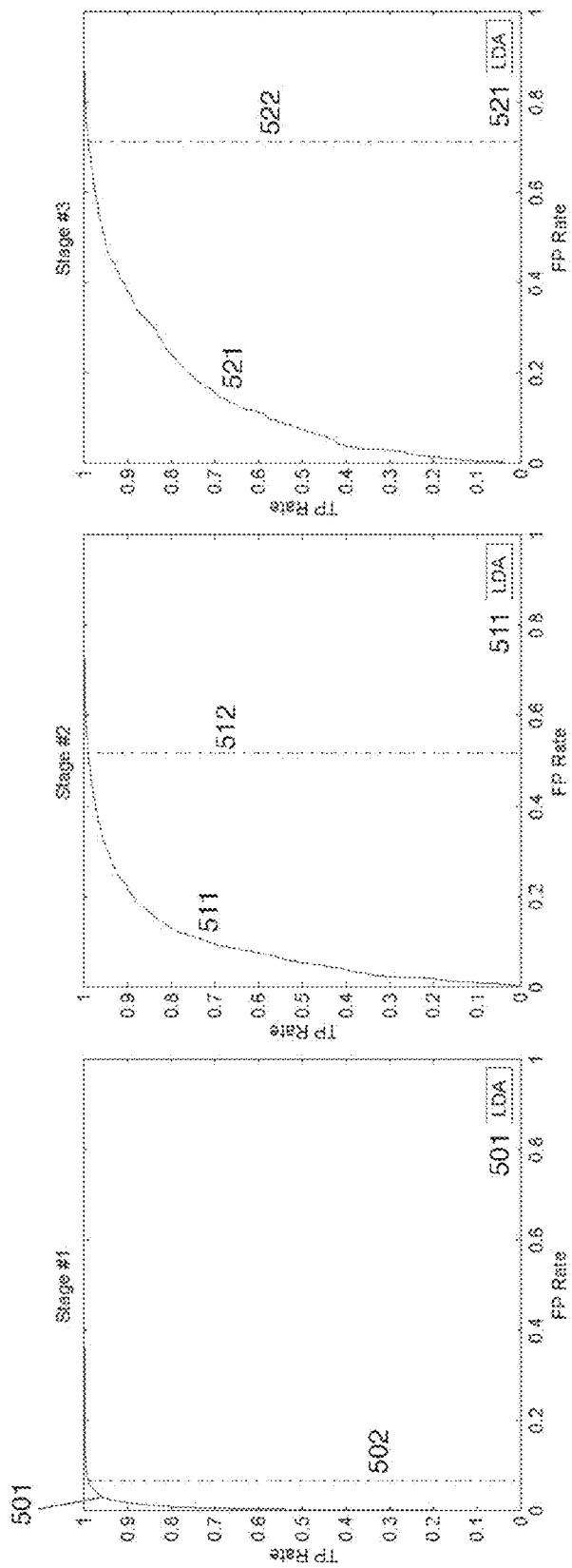
FIG. 5 is a group of charts illustrating results of example linear classifier stages.

FIG. 4 is a group of charts illustrating results of example linear classifiers, arranged in accordance with at least some implementations of the present disclosure. FIG. 5 is a group of charts illustrating results of example linear classifier stages, arranged in accordance with at least some implementations of the present disclosure.

The charts illustrated in FIGS. 4 and 5 show false positive (FP) rate (FPR) along the x-axis and true positive (TP) rate (TPR) along the y-axis. The curves shown in the charts may be described as receiver operating characteristic (ROC) curves for the linear classifiers. In such a representation, 1-TPR may be the loss of detection rate and 1-FPR may be the saving of scanning area in the detection algorithm. As will be appreciated, higher 1-FPR and lower 1-TPR may generally be desirable such that ROC curves tending toward the top-left of the charts may generally be desirable.

Turning now FIG. 4, three charts (4A, 4B, and 4C) are shown for an example face detection implementation. Chart 4A illustrates ROC curves for an implementation where a reference vector representing a statistical mean of faces (i.e., bias: mean) is used. Chart 4B illustrates ROC curves for an implementation when a reference vector representing a random face (i.e. bias: x(1)) is used. Chart 4C illustrates ROC curves for an implementation where a reference vector representing a zero-valued patch (i.e., bias: zero) is used. The type of reference vector for each chart is labeled at the top of each chart for convenience.

As shown, chart 4A includes three ROC curves. ROC curve 401 illustrates an ROC for a weighting vector determined using a reciprocal of standard deviation (STD) for each pixel in a region having an object. ROC curve 402 illustrates an ROC for a weighting vector determined using linear discrimination analysis (LDA). ROC curve 403 illustrates an ROC for a weighting vector determined using a support vector machine (SVM). Further, chart 4A includes three vertical lines 404, 405, and 406, which indicate the FPR when TPR=0.99, for STD, LDA, and SVM, respectively.

Similarly, chart 4B includes three ROC curves. ROC curve 411 illustrates an ROC for a weighting vector determined using a reciprocal of standard deviation (STD) for each pixel in a region having an object, ROC curve 412 illustrates an ROC for a weighting vector determined using linear discrimination analysis (LDA), and ROC curve 413 illustrates an ROC for a weighting vector determined using or using a support vector machine (SVM). Chart 4B also shows three vertical lines 414, 415, and 416, which indicate the FPR when TPR=0.99, for STD, LDA, and SVM, respectively.

Further, chart 4C illustrates three curves. ROC curve 421 illustrates an ROC for a weighting vector determined using a reciprocal of standard deviation (STD) for each pixel in a region having an object, ROC curve 422 illustrates an ROC for a weighting vector determined using linear discrimination analysis (LDA), and ROC curve 423 illustrates an ROC for a weighting vector determined using or using a support vector machine (SVM). Chart 4C also illustrates three vertical lines 424, 425, and 426, which may indicate the FPR when TPR=0.99, for STD, LDA, and SVM, respectively.

As may be determined using charts 4A, 4B, and/or 4C, in facial detection applications, LDA may generally be preferable for determining weighting vector. Also as may be determined using the charts of FIG. 4, a reference vector representing a zero-valued patch (i.e., bias: zero) may generally be preferable in facial detection implementations. Using similar charting techniques and/or analyses, suitable reference vectors and/or techniques for determining weighting vectors may be determine for implementations for other objects (such as, for example, eyes, landmarks, written characters, humans, or automobiles, or the like).

Turning now to FIG. 5, three charts are shown for multiple stages of linear classification in a facial detection implementation. Each stage illustrates an implementation using and a reference vector representing a zero-valued patch (i.e., bias: zero). Chart 5A illustrates an ROC curve 501 showing an ROC for an LDA implementation at stage 1 of processing. Further, chart 5A illustrates vertical line 502, which indicates the FPR when TPR=0.99. Similarly, chart 5B illustrates an ROC curve 511 showing an ROC for an LDA implementation at stage 2 of processing. Chart 5B also shows vertical line 512, which indicates the FPR when TPR=0.99. Further, chart 5C illustrates an ROC curve 521 showing an ROC for an LDA implementation at stage 3 of processing. Chart 5C include vertical line 522 indicating the FPR when TPR=0.99.

As will be appreciated by viewing charts 5A, 5B, and/or 5C, the performance of each stage diminishes for latter stages in this implementation. For this 3-stage linear classifier cascade, the final FPR may be determined as FPR(3 stage) =0.067*0.517*0.713=0.025, while TPR(3 stage)

=0.99^3=0.970. Such an implementation may therefore filter out about 97.5% (1-FPR) of a scanning area (e.g., of an input image) with 3% (1-TPR) of accuracy loss. Such performance may provide real-time object detection and/or recognition. Further, as discussed, such linear classifier stages may be implemented in hardware (i.e., a graphics processor unit), which may provide less power consumption. Such advantages may be especially important in battery operated and/or mobile devices.

Figure 6:
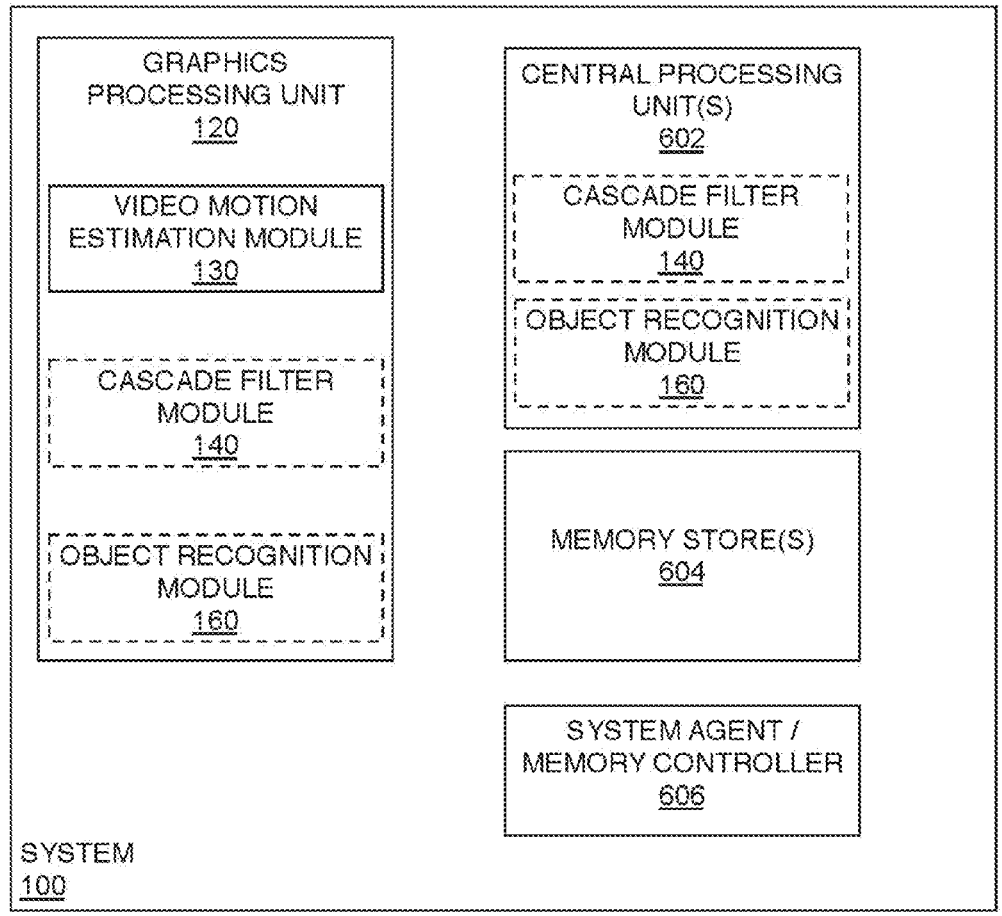
FIG. 6 is an illustrative diagram of an example object detection and/or recognition system.

FIG. 6 is an illustrative diagram of an example system 100 for object detection and/or recognition, arranged in accordance with at least some implementations of the present disclosure. In the illustrated implementation, system 100 may include one or more central processing units 602, one or more memory stores 604, graphics processing unit(s) 120, and/or system agent/memory controller 606. Central processing units 602, memory store 604, graphics processing unit(s) 120, and/or system agent/memory controller 606 may be capable of communication with one another, via, for example, a bus or other access.

As shown in FIG. 6 and discussed above, video estimation module 130 may be implemented via graphics processing unit(s) 120. Further, in various examples, cascade filter module 140 may be implemented via graphics processing unit(s) 120 or central processing units 602. Also, in various examples, object recognition module 160 may be implemented via graphics processing unit(s) 120 or central processing units 602.

Graphics processing unit(s) 120 may include processor(s), multicore processors, application specific integrated circuits, programmable logic devices, graphics cards, integrated graphics, general purpose graphics processing unit(s), or the like. Central processing unit(s) 602 may include any suitable implementation including, for example, microprocessor(s), multicore processors, application specific integrated circuits, chip(s), chipsets, or the like. In addition, memory stores 508 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 508 may be implemented by cache memory. System agent/memory controller may include any suitable implementation configured to manage system 100 and to control memory stores 604. In various examples, system 100 may be implemented as a chipset or as a system on a chip. In an example, system 100 may be implemented as a single chip or device having a graphics processor, a quad-core central processing unit, on-board cache, a memory controller input/output (I/O) module (not shown), and a system agent and memory controller configured to manage display function, I/O functions, and direct media interface (DMI) functions.

Figure 7:
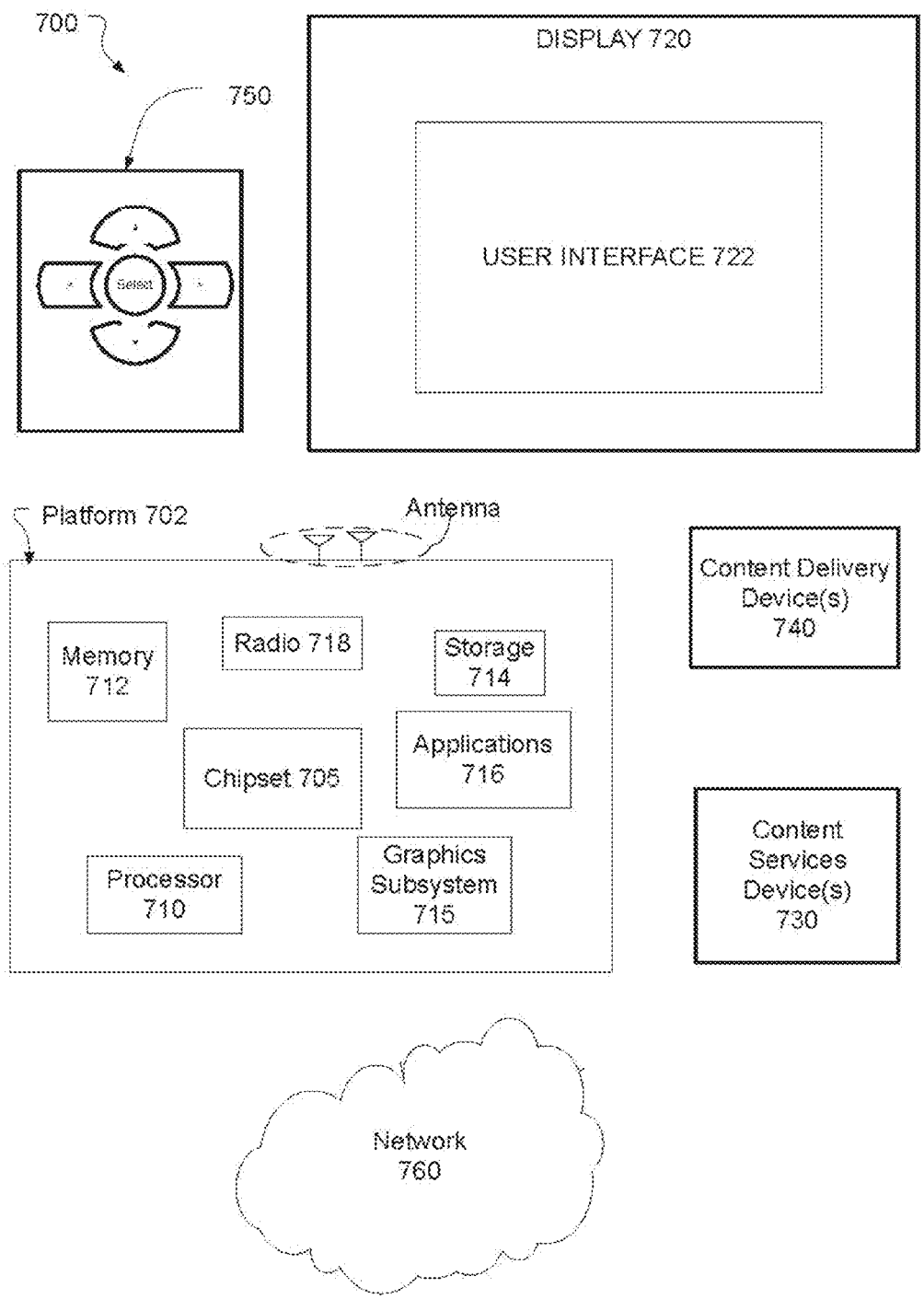
FIG. 7 is an illustrative diagram of an example system.

FIG. 7 illustrates an example system 700 in accordance with the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, Display Port, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content services device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
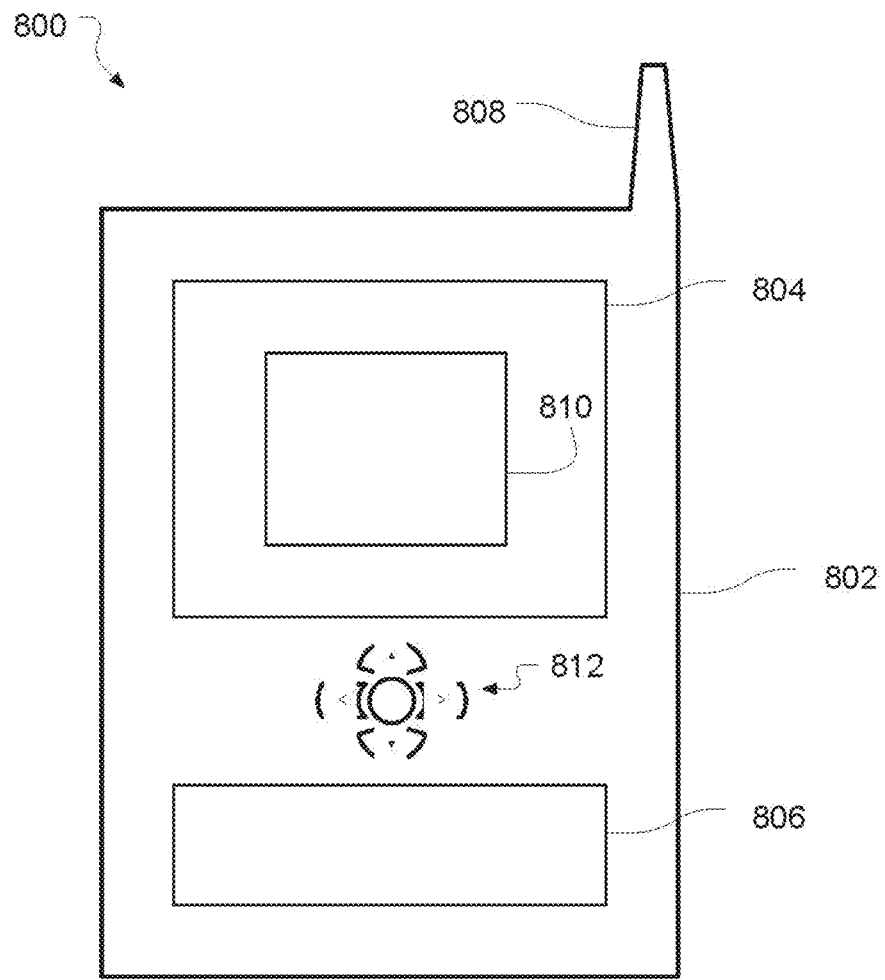
FIG. 8 is an illustrative diagram of an example system, all arranged in accordance with at least some implementations of the present disclosure.

As described above, system 700 may be embodied in varying physical styles or form factors. FIG. 8 illustrates implementations of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internee device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described a mobile computing device implemented as a smart phone by way of example, it may be appreciated that other embodiments may be implemented using other wireless mobile computing devices as well. The embodiments are not limited in this context.

As shown in FIG. 8, device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates memory resources, data bus speeds and other design or performance constraints.

One or more aspects of at least one embodiment may be implemented by representative instructions stored on a machine-readable medium which represents various logic in the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer implemented method for object detection may include receiving an input image. A region of the input image may be determined. A linear classifier may be applied, via a video motion estimation module of a graphics processing unit, to the region of the input image to classify the region as an object candidate region or to reject the region.

In one example, a computer implemented method for object detection may include receiving an input image. A region of the input image may be determined. A linear classifier may be applied, via a video motion estimation module of a graphics processing unit, to the region of the input image to classify the region as an object candidate region or to reject the region. If the region is classified as an object candidate region, a second linear classifier may be applied, via the video motion estimation module of the graphics processing unit, to the region to classify the region as a second stage object candidate region or to reject the region. If the region is classified as a second stage object candidate region, a third linear classifier may be applied, via the video motion estimation module of the graphics processing unit, to the region to classify the region as a third stage object candidate region or to reject the region. If the region is classified as a third stage object candidate region, the region may be transferred to a cascade filter module and the region may be processed via the cascade filter module to classify the region as a cascade filter stage object candidate region or to reject the region. The cascade filter module may include a 7 stage cascade filter, a boosted cascade filter, a Viola-Jones cascade filter, or a Viola-Jones cascade filter implementing feature based classification. Further, an estimate of a motion vector for a video may be determined, via the video motion estimation module of the graphics processing unit. If the region is classified as a cascade filter stage object candidate region, the region may be merged with a second region also classified as a cascade filter stage object candidate region to form a merged region. Object recognition may be performed on the merged region. Applying the linear classifier may include determining an absolute value difference vector based on an absolute value difference between a vector representing the region and a reference vector, such that the reference vector represents a zero-valued patch, a mean object, or a random representative object, determining a result value based on a dot product of the absolute value difference vector and a weighting vector, such that the weighting vector may be a pre-trained weighting vector, a reciprocal of standard deviation pre-trained weighting vector, a linear discriminant pre-trained weighting vector, or a support vector machine pre-trained weighting vector, and comparing the result value to a threshold value. The input image may include an image file or a video frame. The cascade filter module may be implemented via the graphics processing unit or a central processing unit. The object recognition on the object recognition candidate regions may be implemented via the graphics processing unit or the central processing unit.

In other examples, a system for object detection on a computer may include a graphics processing unit including a video motion estimation module configured to determine a region of an input image and to apply a linear classifier to the region of the input image to classify the region as an object candidate region or to reject the region, one or more processors communicatively coupled to the graphics processing unit, and one or more memory stores communicatively coupled to the one or more processors.

In another example, a system may further include an object recognition module configured to perform object recognition on the region to identify an object in the region, the object including a face, an eye, a landmark, a written character, a human, or an automobile. The video estimation module may be configured to apply the linear classifier to the region to classify the region as an object candidate region or to reject the region by determining an absolute value difference vector based on an absolute value difference between a vector representing the region and a reference vector, such that the reference vector represents a zero-valued patch, a mean object, or a random representative object, determining a result value based on a dot product of the absolute value difference vector and a weighting vector, such that the weighting vector may be a pre-trained weighting vector, a reciprocal of standard deviation pre-trained weighting vector, a linear discriminant pre-trained weighting vector, or a support vector machine pre-trained weighting vector, and comparing the result value to a threshold value. The video motion estimation module may be further configured to apply a second linear classifier to the region to classify the region as a second stage object candidate region or to reject the region, if the region is classified as an object candidate region. The video motion estimation module may be further configured to apply a third linear classifier to the region to classify the region as a third stage object candidate region or to reject the region, if the region is classified as second stage object candidate region. The video motion estimation module may be further configured to estimate a motion vector for a video. The cascade filter module may be implemented via the graphics processing unit or the one or more processors. The object recognition module may be implemented via the graphics processing unit or the one or more processors. The graphics processing unit, the one or more processors, and the one or more memory stores may be a system on a chip. The input image may be an image file or a video frame In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for object detection comprising:
  receiving an input image comprising at least one of an image file or a video frame;
  determining a region of the input image;
  applying, via a video motion estimation module of a graphics processing unit, a linear classifier to the region of the input image to classify the region as an object candidate region or to reject the region;
  if the region is classified as an object candidate region, applying, via the video motion estimation module of the graphics processing unit, a second linear classifier to the region to classify the region as a second stage object candidate region or to reject the region;
  if the region is classified as a second stage object candidate region, applying, via the video motion estimation module of the graphics processing unit, a third linear classifier to the region to classify the region as a third stage object candidate region or to reject the region;
  if the region is classified as a third stage object candidate region, transferring the region to a cascade filter module implemented via the graphics processing unit or a central processing unit and processing the region via the cascade filter module to classify the region as a cascade filter stage object candidate region or to reject the region, wherein the cascade filter module comprises a 7 stage cascade filter, wherein the cascade filter comprises at least one of a boosted cascade filter, a Viola-Jones cascade filter, or a Viola-Jones cascade filter implementing feature based classification;
  determining, via the video motion estimation module of the graphics processing unit, an estimate of a motion vector for a video;
  if the region is classified as a cascade filter stage object candidate region, merging the region with a second region also classified as a cascade filter stage object candidate region to form a merged region;
  if the region is classified as a cascade filter object candidate region, performing object recognition on the region via at least one of the graphics processing unit or the central processing unit, wherein performing the object recognition comprises identifying an object in the region, and wherein the object comprises at least one of a face, an eye, a landmark, a written character, a human, or an automobile; and
  if the merged region is formed, performing object recognition on the merged region,
  wherein applying, via the video motion estimation module of the graphics processing unit, the linear classifier to the region comprises:
    determining an absolute value difference vector based on an absolute value difference between a vector representing the region and a reference vector, wherein the reference vector represents at least one of a zero-valued patch, a mean object, or a random representative object;
    determining a result value based on a dot product of the absolute value difference vector and a weighting vector, wherein the weighting vector comprises at least one of a pre-trained weighting vector, a reciprocal of standard deviation pre-trained weighting vector, a linear discriminant pre-trained weighting vector, or a support vector machine pre-trained weighting vector; and comparing the result value to a threshold value.

2. A system for object detection on a computer comprising:
a graphics processing unit comprising video motion estimation hardwired circuitry to determine a region of an input image and to apply a linear classifier to the region of the input image to classify the region as an object candidate region or to reject the region;
one or more processors communicatively coupled to the graphics processing unit;
one or more memory stores communicatively coupled to the one or more processors;
cascade filter hardwired circuitry to classify the region as a cascade filter stage object candidate region or to reject the region, wherein the cascade filter module comprises a 7 stage cascade filter, wherein the cascade filter comprises at least one of a boosted cascade filter, a Viola-Jones cascade filter, or a Viola-Jones cascade filter to implement feature based classification; and
object recognition hardwired circuitry to perform object recognition on the region to identify an object in the region, wherein the object comprises at least one of a face, an eye, a landmark, a written character, a human, or an automobile,
wherein the video estimation hardwired circuitry to apply the linear classifier to the region to classify the region as an object candidate region or to reject the region comprises the video estimation hardwired circuitry to:
determine an absolute value difference vector based on an absolute value difference between a vector representing the region and a reference vector, wherein the reference vector represents at least one of a zero-valued patch, a mean object, or a random representative object;
determine a result value based on a dot product of the absolute value difference vector and a weighting vector, wherein the weighting vector comprises at least one of a pre-trained weighting vector, a reciprocal of standard deviation pre-trained weighting vector, a linear discriminant pre-trained weighting vector, or a support vector machine pre-trained weighting vector; and
compare the result value to a threshold value, wherein the video motion estimation hardwired circuitry is further to:
if the region is classified as an object candidate region, apply a second linear classifier to the region to classify the region as a second stage object candidate region or to reject the region;
if the region is classified as a second stage object candidate region, apply a third linear classifier to the region to classify the region as a third stage object candidate region or to reject the region; and
estimate a motion vector for a video,
wherein the cascade filter hardwired circuitry is implemented via at least one of the graphics processing unit or the one or more processors, wherein the object recognition hardwired circuitry is implemented via at least one of the graphics processing unit or the one or more processors, wherein the graphics processing unit, the one or more processors, and the one or more memory stores comprise a system on a chip, and wherein the input image comprises at least one of an image file or a video frame.

3. At least one non-transitory machine readable medium comprising a plurality of instructions that in response to being executed on a computing device, cause the computing device to perform object detection by:
receiving an input image comprising at least one of an image file or a video frame;
determining a region of the input image;
applying, via a video motion estimation module of a graphics processor, a linear classifier to the region of the input image to classify the region as an object candidate region or to reject the region;
if the region is classified as an object candidate region, applying a second linear classifier to the region to classify the region as a second stage object candidate region or to reject the region;
if the region is classified as a second stage object candidate region, applying a third linear classifier to the region to classify the region as a third stage object candidate region or to reject the region;
if the region is classified as a third stage object candidate region, transferring the region to a cascade filter module implemented via the graphics processor or a central processor and processing the region via the cascade filter module to classify the region as a cascade filter stage object candidate region or to reject the region, wherein the cascade filter module comprises a 7 stage cascade filter, wherein the cascade filter comprises at least one of a boosted cascade filter, a Viola-Jones cascade filter, or a Viola-Jones cascade filter implementing feature based classification;
determining, via the video motion estimation module of the graphics processor, an estimate of a motion vector for a video;
if the region is classified as a cascade filter object candidate region, performing object recognition on the region via at least one of the graphics processor or the central processor, wherein performing the object recognition comprises identifying an object in the region, and wherein the object comprises at least one of a face, an eye, a landmark, a written character, a human, or an automobile; and
wherein applying, via the video motion estimation module of the graphics processing unit, the linear classifier to the region comprises:
determining an absolute value difference vector based on an absolute value difference between a vector representing the region and a reference vector, wherein the reference vector represents at least one of a zero-valued patch, a mean object, or a random representative object;
determining a result value based on a dot product of the absolute value difference vector and a weighting vector, wherein the weighting vector comprises at least one of a pre-trained weighting vector, a reciprocal of standard deviation pre-trained weighting vector, a linear discriminant pre-trained weighting vector, or a support vector machine pre-trained weighting vector; and
comparing the result value to a threshold value.

4. A system for object detection comprising:
a graphics processor comprising video motion estimation logic circuitry to apply a multi-stage linear classifier to a region of an input image to classify the region as an object candidate region or to reject the region;
one or more processors communicatively coupled to the graphics processing unit;

one or more memory stores communicatively coupled to the one or more processors;

cascade filter logic circuitry implemented via at least one of the graphics processor or the one or more processors to, if the region is classified as an object candidate region, classify the region as a cascade filter stage object candidate region or to reject the region, wherein the cascade filter logic circuitry comprises a multi-stage cascade filter to implement feature based classification;

object recognition logic circuitry implemented via at least one of the graphics processing unit or the one or more processors to, if the region is classified as a cascade filter stage object candidate region, perform object recognition on the region to identify an object in the region, wherein the object comprises at least one of a face, an eye, a landmark, a written character, a human, or an automobile, and wherein the video estimation logic circuitry to apply the multi-stage linear classifier comprises the video estimation hardwired circuitry to determine an absolute value difference vector based on an absolute value difference between a vector representing the region and a reference vector, determine a result value based on a dot product of the absolute value difference vector and a weighting vector, and compare the result value to a threshold value.

5. The system of claim 4, wherein the multi-stage linear classifier comprises a three stage linear classifier.

6. The system of claim 4, wherein the multi-stage cascade filter comprises at least one of a boosted cascade filter, a Viola-Jones cascade filter, or a Viola-Jones cascade filter.

7. The system of claim 4, wherein the multi-stage cascade filter comprises a 7 stage cascade filter.

8. The system of claim 4, wherein the reference vector represents at least one of a zero-valued patch, a mean object, or a random representative object.

9. The system of claim 4, wherein the weighting vector comprises at least one of a pre-trained weighting vector, a reciprocal of standard deviation pre-trained weighting vector, a linear discriminant pre-trained weighting vector, or a support vector machine pre-trained weighting vector.

10. The system of claim 4, wherein the graphics processing unit, the one or more processors, and the one or more memory stores comprise a system on a chip.

11. The system of claim 4, wherein the input image comprises at least one of an image file or a video frame.

12. The system of claim 4, wherein the video motion estimation logic circuitry is further to estimate of a motion vector for a video.

* * * * *